(12) United States Patent
Tao

(10) Patent No.: US 8,747,561 B2
(45) Date of Patent: Jun. 10, 2014

(54) CELLULOSE HYDROLYSIS WITH PH ADJUSTMENT

(75) Inventor: Zhi Tao, Marietta, GA (US)

(73) Assignee: Renmatix, Inc., King of Prussia, PA (US)

( * ) Notice: Subject to any disclaimer, the term of this patent is extended or adjusted under 35 U.S.C. 154(b) by 127 days.

(21) Appl. No.: 13/464,402

(22) Filed: May 4, 2012

(65) Prior Publication Data

US 2012/0279496 A1    Nov. 8, 2012

Related U.S. Application Data

(60) Provisional application No. 61/482,465, filed on May 4, 2011.

(51) Int. Cl.
    *C13B 50/00*    (2011.01)
(52) U.S. Cl.
    USPC .......................................................... 127/37
(58) Field of Classification Search
    None
    See application file for complete search history.

(56) References Cited

U.S. PATENT DOCUMENTS

| | | |
|---|---|---|
| 2,198,785 A | 4/1940 | Mohr et al. |
| 2,356,500 A | 8/1944 | Boinot |
| 2,516,833 A | 8/1950 | Ant-Wuorinen |
| 2,681,871 A | 6/1954 | Wallace |
| 2,759,856 A | 8/1956 | Saums et al. |
| 2,801,939 A | 8/1957 | Hignett et al. |
| 3,212,932 A | 10/1965 | Hess et al. |
| 3,314,797 A | 4/1967 | Hess et al. |
| 4,201,596 A | 5/1980 | Church et al. |
| 4,427,453 A | 1/1984 | Reitter |
| 4,468,256 A | 8/1984 | Hinger |
| 4,556,430 A | 12/1985 | Converse et al. |
| 4,612,286 A | 9/1986 | Sherman et al. |
| 4,637,835 A | 1/1987 | Nagle |
| 4,699,124 A | 10/1987 | Nagle |
| 5,125,977 A | 6/1992 | Grohmann et al. |
| 5,705,369 A | 1/1998 | Torget et al. |
| 6,022,419 A | 2/2000 | Torget et al. |
| 6,921,820 B2 | 7/2005 | Arai et al. |
| 8,057,639 B2 | 11/2011 | Pschorn et al. |
| 2009/0288788 A1 | 11/2009 | Castor |
| 2010/0043782 A1* | 2/2010 | Kilambi et al. .................. 127/1 |
| 2010/0069626 A1 | 3/2010 | Kilambi |
| 2010/0170504 A1 | 7/2010 | Zhang |
| 2010/0203605 A1 | 8/2010 | Kim et al. |

FOREIGN PATENT DOCUMENTS

| | | |
|---|---|---|
| AU | 2007274388 | 5/2008 |
| DE | 3225074 | 1/1984 |
| EP | 98490 | 1/1984 |

(Continued)

OTHER PUBLICATIONS

Adschiri et al., "Noncatalytic Conversion of Cellulose in Supercritical and Sub-Critical Water", Journal of Chemical Engineering of Japan, 1993, 26(6): 676-680.

(Continued)

*Primary Examiner* — Melvin C Mayes
*Assistant Examiner* — Stefanie Cohen
(74) *Attorney, Agent, or Firm* — Ballard Spahr LLP; Travis B. Gasa

(57) ABSTRACT

Methods are disclosed for controlling the rate of cellulose hydrolysis and reducing the rate of glucose degradation by adjusting the pH during cellulose hydrolysis.

29 Claims, 4 Drawing Sheets

Effect of pH on conversions (T=375 °C)

(56) References Cited

FOREIGN PATENT DOCUMENTS

| | | |
|---|---|---|
| EP | 1686192 | 8/2006 |
| GB | 2145090 | 3/1985 |
| JP | 2001095594 | 4/2001 |
| JP | 2003212888 | 7/2003 |
| JP | 2006263527 | 10/2006 |
| JP | 2008011753 | 1/2008 |
| KR | 2009030967 | 3/2009 |
| WO | 8301958 | 6/1983 |
| WO | 9967409 | 12/1999 |
| WO | 0061276 | 10/2000 |
| WO | 2007120210 | 10/2007 |
| WO | 2009060126 | 5/2009 |
| WO | 2010034055 | 4/2010 |
| WO | 2010045576 | 4/2010 |
| WO | 2011091044 | 7/2011 |

OTHER PUBLICATIONS

Adschiri et al., "Cellulose hydrolysis in supercritical water to recover chemicals", Reaction Engineering for Pollution Prevention, 2000, 205-220.
Arai et al., "(Abstract) Biomass conversion in supercritical water for chemical recycle", Enerugi, Shigen, 16(2), 1995, 175-180.
Ehara et al., "A comparative study on chemical conversion of cellulose between the batch-type and flow-type in supercritical water", Cellulose, 2002, vol. 9, 301-311.
Gong et al., "(Abstract) Study on hydrolysis and saccharification of microcrystalline cellulose in supercritical water", Xiandai Huagong, 30(2), 2010, 44-47.
Kupianen et al., "Comparison of formic and sulfuric acids as a glucose decomposition catalyst", Ind. Eng. Chem. Res., 49(18), 2010, 8444-9.
Lee et al., "(Abstract) Hydrolysis of cellulose under subcritical and supercritical water using continuous flow system", Hwahak Konghak, 39(2), 2001, 257-263.
Li et al., "Fructose decomposition kinetics in organic acids-enriched high temperature liquid water", Biomass and Bioenergy, vol. 33, Issue 9, Sep. 2009, 1182-1187.
Luterbacher et al., "(Abstract) High-Solids Biphasic CO2-H2O Pretreatment of Lignocellulosic Biomass", Biotechnology and Bioengineering, 107(3), 2010, 451-460.
Malaluan et al., "Biomass conversion in supercritical water", Off. Proc. Comb. Conf., 6th Conf. Asia Pac. Confed. Chem. Eng., 21st Australas. Chem. Eng. Conf., vol. 1, 1993, 2091/1-214/1.
Matsunaga et al., "Super-rapid chemical conversion of sugi wood by supercritical and subcritical water treatment", Mokuzai Gakkaishi, 50(5), 2004, 325-32.
Mok et al., "(Abstract) Dilute acid hydrolysis of biopolymers in a semi-batch flow reactor at supercritical pressure", Energy from Biomass and Wastes, 13, 1990, 1329-1347.
Mosier et al., "(Abstract) Optimization of pH controlled liquid hot water pretreatment of corn stover", Bioresource Technology, 96(18), 2005, 1986-1992.
Mosier et al., "Characterization of Acid Catalytic Domains for Cellulose Hydrolysis and Glucose Degradation", Biotechnology and Bioengineering, vol. 79, No. 6, Sep. 20, 2002, 610-618.
Nakata et al., "(Abstract) Bioethanol from cellulose with supercritical water treatment followed by enzymatic hydrolysis", Applied Biochemistry and Biotechnology, 129-132, 2006, 476-485.
Park et al., "(Abstract) Kinetics of cellulose decomposition under subcritical and supercritical water in continuous flow system", Korean Journal of Chemical Engineering, 19(6), 2002, 960-966.
Saka, "Supercritical fluids to biomass research", Cellulose Communications, 5(3), 1998, 129-35.
Saka et al., "Supercritical fluids to biomass research (II)", Cellulose Communications, 9(3), 2002, 137-43.
Saka et al., "Chemical conversion of various celluloses to glucose and its derivatives in supercritical water", Cellulose Communications, 6(3), 1999, 177-191.
Sasaki et al., "Cellulose Hydrolysis in Sub-Critical and Supercritical Water", Journal of Supercritical Fluids, 1998, 13:261-268.
Sasaki et al., "Super-rapid enzymatic hydrolysis of cellulose with supercritical water solubilization pretreatment", Kobunshi Ronbunshu, 58(10), 2001, 527-32.
Sasaki et al., "Dissolution and Hydrolysis of Cellulose in Subcritical and Supercritical Water", Industrial & Engineering Chemistry Research, 39(8), 2000, 2883-2890.
Sasaki et al., "Kinetics of cellulose conversion at 25 MPa in sub-and supercritical water", AIChE Journal, 50(1), 2004, 192-202.
Sera et al., "Development of saccharification techniques for cellulosic biomass", Hitz Giho, 68(2), 2008, 40-5.
Soederstroem et al., "(Abstract) Effect of Washing on Yield in One- and Two-Step Steam Pretreatment of Softwood for Production of Ethanol", Biotechnology Progress, 20(3), 2004, 744-749.
Srinivasan et al., "Pretreatment of Guayule Biomass Using Supercritical Carbon Dioxide-Based Method", Bioresource Technology, 101(24), 2010, 9785-9791.
Vick Roy et al., "Biomass hydrolysis with sulfur dioxide and water in the region of the critical point", Process Technology Proceedings, 3 Supercrit. Flud Technol., 1985, 397-444.
Zhao et al., "Fermentable hexose production from corn stalks and wheat straw with combined supercritical and subcritical hydrothermal technology", Bioresource Technology, 100(23), 2009, 5884-5889.
Zhao et al., "Supercritical hydrolysis of cellulose for oligosaccharide production in combined technology", Chemical Engineering Journal, Aug. 1, 2009, 150(2):411-417.
Zhao et al., "Combined supercritical and subcritical process for cellulose hydrolysis to fermentable hexoses", Environmental Science & Technology, 43(5), 2009, 1565-1570.
Zhao et al., "Supercritical pretreatment and hydrolysis of cellulose", Huaxue Xuebao, 66(20), 2008, 2295-2301.
International Patent Application No. PCT/US2012/036612, International Search Report and Written Opinion, mailed Nov. 30, 2012 (9 pages).

\* cited by examiner

CELLULOSE HYDROLYSIS WITH PH ADJUSTMENT

CROSS REFERENCE TO RELATED APPLICATIONS

The application claims the benefit of U.S. Application No. 61/482,465, filed May 4, 2011, the entire disclosure of which is incorporated herein by reference.

FIELD OF THE INVENTION

The present invention generally relates to methods for controlling the rate of cellulose hydrolysis and reducing the rate of glucose degradation. More particularly, it relates to methods for controlling the rate of cellulose hydrolysis and reducing the rate of glucose degradation by adjusting the pH during cellulose hydrolysis.

BACKGROUND OF THE INVENTION

There exist methods for converting lignocellulosic biomass into fermentable $C_5$ and $C_6$ sugars. Several of these methods first produce oligomers of the $C_5$ and $C_6$ sugars, which are then hydrolyzed to form fermentable streams of monomers of $C_5$ and $C_6$ sugars. Problems exist with current methods, including, inter alia, that due to the very short residence times in the reactor there are control issues often lead to unwanted degradation products, such as acids that inhibit fermentation. It would, therefore, be beneficial to develop methods that would be scalable and controllable, that maximize monomer formation, and that minimize the formation of degradation products. The methods and compositions of the present invention are directed toward these, as well as other, important ends.

SUMMARY OF THE INVENTION

In one embodiment, the invention is directed to methods of increasing the level of $C_6$ monosaccharides produced from lignocellulosic biomass, comprising:
 providing lignocellulosic biomass at a first pressure greater than atmospheric pressure, comprising:
  a first solid fraction comprising:
   cellulose; and
   lignin; and
  a first liquid fraction;
 separating said first solid fraction from said first liquid fraction;
 mixing said first solid fraction with water to form a slurry;
 wherein said slurry has a pH of about pH 3.0 to about pH 4.5;
 increasing said pH of said slurry by about 0.5 pH units to about 5.0 pH units to form an adjusted pH slurry;
 optionally, pre-heating said adjusted pH slurry to a temperature less than the critical point of water;
 contacting said adjusted pH slurry with a second reaction fluid comprising supercritical or near-supercritical fluid to form a reaction mixture comprising:
  a second solid fraction comprising:
   lignin; and
  a second liquid fraction comprising:
   a soluble $C_6$ saccharide selected from the group consisting of cello-oligosaccharides, glucose, galactose, mannose, fructose, and mixtures thereof;
  wherein said supercritical or near-critical fluid comprises water and, optionally, $CO_2$; and
  wherein said contacting said adjusted pH slurry with a second reaction fluid has a duration greater than about 2 seconds;
 optionally, reducing the temperature of said reaction mixture to a temperature below about 280° C.; and
 optionally, hydrolyzing said second liquid fraction to form a $C_6$ saccharide selected from the group consisting of $C_6$ oligosaccharide having lower mer units, glucose, galactose, mannose, fructose, and mixtures thereof.

In another embodiment, the invention is directed to methods of controlling the rate of cellulose hydrolysis, comprising:
 providing lignocellulosic biomass at a first pressure greater than atmospheric pressure, comprising:
  a first solid fraction comprising:
   cellulose; and
   lignin; and
  a first liquid fraction;
 separating said first solid fraction from said first liquid fraction;
 mixing said first solid fraction with water to form a slurry;
 wherein said slurry has a pH of about pH 3.0 to about pH 4.5;
 increasing said pH of said slurry by about 0.5 pH units to about 5.0 pH units to form an adjusted pH slurry;
 optionally, pre-heating said adjusted pH slurry to a temperature less than the critical point of water;
 contacting said adjusted pH slurry with a second reaction fluid comprising supercritical or near-supercritical fluid to form a reaction mixture comprising:
  a second solid fraction comprising:
   lignin; and
  a second liquid fraction comprising:
   a soluble $C_6$ saccharide selected from the group consisting of cello-oligosaccharides, glucose, galactose, mannose, fructose, and mixtures thereof;
  wherein said supercritical or near-critical fluid comprises water and, optionally, $CO_2$; and
  wherein said contacting said adjusted pH slurry with a second reaction fluid has a duration greater than about 2 seconds;
 optionally, reducing the temperature of said reaction mixture to a temperature below about 280° C.; and
 optionally, hydrolyzing said second liquid fraction to form a $C_6$ saccharide selected from the group consisting of $C_6$ oligosaccharide having lower mer units, glucose, galactose, mannose, fructose, and mixtures thereof.

In yet other embodiments, the invention is directed to methods of reducing the rate of glucose degradation, comprising:
 providing lignocellulosic biomass at a first pressure greater than atmospheric pressure, comprising:
  a first solid fraction comprising:
   cellulose; and
   lignin; and
  a first liquid fraction;
 separating said first solid fraction from said first liquid fraction;
 mixing said first solid fraction with water to form a slurry;
 wherein said slurry has a pH of about pH 3.0 to about pH 4.5;
 increasing said pH of said slurry by about 0.5 pH units to about 5.0 pH units to form an adjusted pH slurry;
 optionally, pre-heating said adjusted pH slurry to a temperature less than the critical point of water;

contacting said adjusted pH slurry with a second reaction fluid comprising supercritical or near-supercritical fluid to form a reaction mixture comprising:
a second solid fraction comprising:
lignin; and
a second liquid fraction comprising:
a soluble $C_6$ saccharide selected from the group consisting of cello-oligosaccharides, glucose, galactose, mannose, fructose, and mixtures thereof;
wherein said supercritical or near-critical fluid comprises water and, optionally, $CO_2$; and
wherein said contacting said adjusted pH slurry with a second reaction fluid has a duration greater than about 2 seconds;
optionally, reducing the temperature of said reaction mixture to a temperature below about 280° C.; and
optionally, hydrolyzing said second liquid fraction to form a $C_6$ saccharide selected from the group consisting of $C_6$ oligosaccharide having lower mer units, glucose, galactose, mannose, fructose, and mixtures thereof.

In other embodiments, the invention is directed to methods, comprising:
providing lignocellulosic biomass at a first pressure greater than atmospheric pressure, comprising:
a first solid fraction comprising:
cellulose; and
lignin; and
a first liquid fraction;
separating said first solid fraction from said first liquid fraction;
mixing said first solid fraction with water to form a slurry;
wherein said slurry has a pH of about pH 3.0 to about pH 4.5;
increasing said pH of said slurry by about 0.5 pH units to about 5.0 pH units to form an adjusted pH slurry;
optionally, pre-heating said adjusted pH slurry to a temperature less than the critical point of water;
contacting said adjusted pH slurry with a second reaction fluid comprising supercritical or near-supercritical fluid to form a reaction mixture comprising:
a second solid fraction comprising:
lignin; and
a second liquid fraction comprising:
a soluble $C_6$ saccharide selected from the group consisting of cello-oligosaccharides, glucose, galactose, mannose, fructose, and mixtures thereof;
wherein said supercritical or near-critical fluid comprises water and, optionally, $CO_2$; and
wherein said contacting said adjusted pH slurry with a second reaction fluid has a duration greater than about 2 seconds;
reducing the temperature of said reaction mixture to a temperature below about 280° C.;
hydrolyzing said second liquid fraction to form $C_6$ saccharides selected from the group consisting of $C_6$ oligosaccharide having lower mer units, glucose, galactose, mannose, fructose, and mixtures thereof; and
converting by fermentation, catalysis, or a combination thereof said $C_6$ saccharides to a fermentation product, a catalysis product, or a mixture thereof.

In further embodiments, the invention is directed to compositions formed from lignocellulosic biomass, comprising:
$C_6$ saccharide;
less than about 15%, preferably, less than about 10%, by weight, based on the total weight of the composition, of byproducts, wherein said byproducts are selected from the group consisting of glycolaldehyde, glycolic acid, glyceraldehyde, and mixtures thereof; and
water;
wherein said $C_6$ saccharides are produced from said lignocellulosic biomass using supercritical or near critical fluids.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
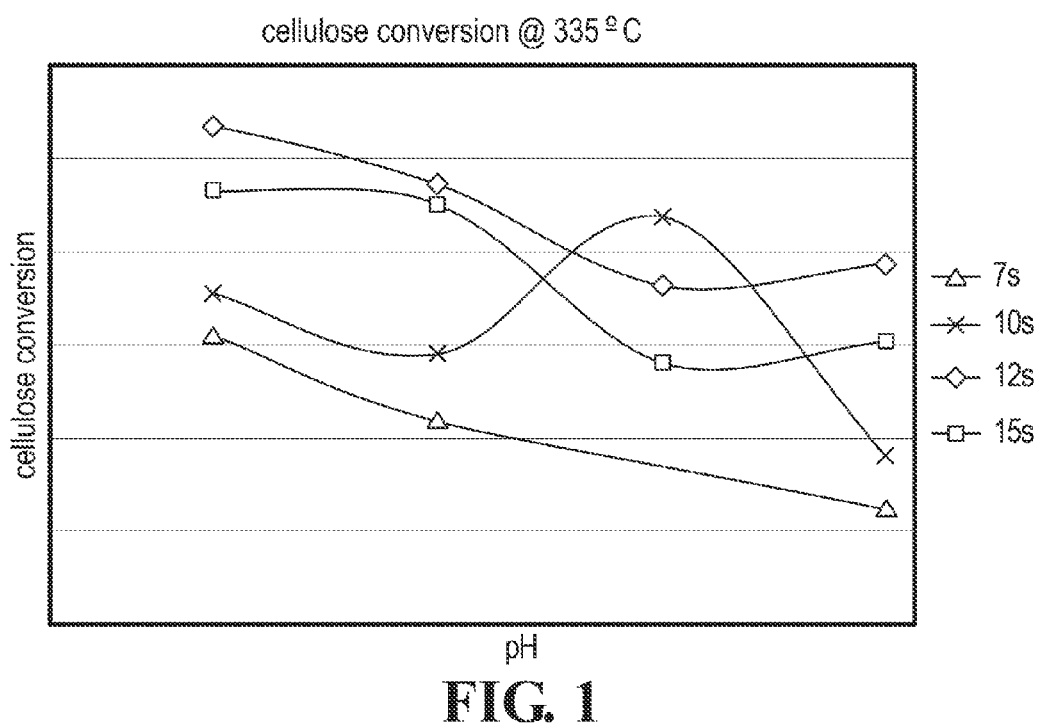
FIG. 1 is a plot of % cellulose conversion as a function of pH at different residence times at a temperature of 335° C. for one embodiment of the invention.

As employed above and throughout the disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, the phrase "substantially free" means have no more than about 1%, preferably less than about 0.5%, more preferably, less than about 0.1%, by weight of a component, based on the total weight of any composition containing the component.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, "resides" indicates the length of time which a given portion or bolus of material is within a reaction zone or reactor vessel. The "residence time," as used herein, including the examples and data, are reported at ambient conditions and are not necessarily actual time elapsed.

As used herein, the term "substantial free of" refers to a composition having less than about 1% by weight, preferably less than about 0.5% by weight, and more preferably less than about 0.1% by weight, based on the total weight of the composition, of the stated material.

As used herein, "$C_1$-$C_5$ alcohol" indicates an alcohol comprising 1 to 5 carbon atoms. Examples of $C_1$-$C_5$ alcohols include, but are not limited to, methanol, ethanol, n-propanol, isopropanol, n-butanol, s-butanol, t-butanol, i-butanol, n-pentanol, 2-pentanol, 3-pentanol, 2-methyl-1-butanol, 2-methyl-2-butanol, 3-methyl-1-butanol, 3-methyl-2-butanol, and 2,2-dimethyl-1-propanol. Mixtures of one or more of these alcohols may be used.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides).

Accordingly, in one embodiment, the invention is directed to methods of increasing the level of $C_6$ monosaccharides produced from lignocellulosic biomass, comprising:
  providing lignocellulosic biomass at a first pressure greater than atmospheric pressure, comprising:
    a first solid fraction comprising:
      cellulose; and
      lignin; and
    a first liquid fraction;
  separating said first solid fraction from said first liquid fraction;
  mixing said first solid fraction with water to form a slurry;
  wherein said slurry has a pH of about pH 3.0 to about pH 4.5;
  increasing said pH of said slurry by about 0.5 pH units to about 5.0 pH units to form an adjusted pH slurry;
  optionally, pre-heating said adjusted pH slurry to a temperature less than critical point of water;
  contacting said adjusted pH slurry with a second reaction fluid comprising supercritical or near-supercritical fluid to form a reaction mixture comprising:
    a second solid fraction comprising:
      lignin; and
    a second liquid fraction comprising:
      a soluble $C_6$ saccharide selected from the group consisting of cello-oligosaccharides, glucose, galactose, mannose, fructose, and mixtures thereof;
    wherein said supercritical or near-critical fluid comprises water and, optionally, $CO_2$; and
  wherein said contacting said adjusted pH slurry with a second reaction fluid has a duration greater than about 2 seconds;
  optionally, reducing the temperature of said reaction mixture to a temperature below about 280° C.; and
  optionally, hydrolyzing said second liquid fraction to form a $C_6$ saccharide selected from the group consisting of $C_6$ oligosaccharide having lower mer units (relative to the oligosaccharides in said second liquid fraction), glucose, galactose, mannose, fructose, and mixtures thereof.

In another embodiment, the invention is directed to methods of controlling the rate of cellulose hydrolysis, comprising:
- providing lignocellulosic biomass at a first pressure greater than atmospheric pressure, comprising:
  - a first solid fraction comprising:
    - cellulose; and
    - lignin; and
  - a first liquid fraction;
- separating said first solid fraction from said first liquid fraction;
- mixing said first solid fraction with water to form a slurry;
- wherein said slurry has a pH of about pH 3.0 to about pH 4.5;
- increasing said pH of said slurry by about 0.5 pH units to about 5.0 pH units to form an adjusted pH slurry;
- optionally, pre-heating said adjusted pH slurry to a temperature less than critical point of water;
- contacting said adjusted pH slurry with a second reaction fluid comprising supercritical or near-supercritical fluid to form a reaction mixture comprising:
  - a second solid fraction comprising:
    - lignin; and
  - a second liquid fraction comprising:
    - a soluble $C_6$ saccharide selected from the group consisting of cello-oligosaccharides, glucose, galactose, mannose, fructose, and mixtures thereof;
    - wherein said supercritical or near-critical fluid comprises water and, optionally, $CO_2$; and
    - wherein said contacting said adjusted pH slurry with a second reaction fluid has a duration greater than about 2 seconds;
- optionally, reducing the temperature of said reaction mixture to a temperature below about 280° C.; and
- optionally, hydrolyzing said second liquid fraction to form a $C_6$ saccharide selected from the group consisting of $C_6$ oligosaccharide having lower mer units (relative to the oligosaccharides in said second liquid fraction), glucose, galactose, mannose, fructose, and mixtures thereof.

In yet other embodiments, the invention is directed to methods of reducing the rate of glucose degradation, comprising:
- providing lignocellulosic biomass at a first pressure greater than atmospheric pressure, comprising:
  - a first solid fraction comprising:
    - cellulose; and
    - lignin; and
  - a first liquid fraction;
- separating said first solid fraction from said first liquid fraction;
- mixing said first solid fraction with water to form a slurry;
- wherein said slurry has a pH of about pH 3.0 to about pH 4.5;
- increasing said pH of said slurry by about 0.5 pH units to about 5.0 pH units to form an adjusted pH slurry;
- optionally, pre-heating said adjusted pH slurry to a temperature less than critical point of water;
- contacting said adjusted pH slurry with a second reaction fluid comprising supercritical or near-supercritical fluid to form a reaction mixture comprising:
  - a second solid fraction comprising:
    - lignin; and
  - a second liquid fraction comprising:
    - a soluble $C_6$ saccharide selected from the group consisting of cello-oligosaccharides, glucose, galactose, mannose, fructose, and mixtures thereof;
    - wherein said supercritical or near-critical fluid comprises water and, optionally, $CO_2$; and
    - wherein said contacting said adjusted pH slurry with a second reaction fluid has a duration greater than about 2 seconds;
- optionally, reducing the temperature of said reaction mixture to a temperature below about 280° C.; and
- optionally, hydrolyzing said second liquid fraction to form a $C_6$ saccharide selected from the group consisting of $C_6$ oligosaccharide having lower mer units (relative to the oligosaccharides in said second liquid fraction), glucose, galactose, mannose, fructose, and mixtures thereof.

In other embodiments, the invention is directed to methods, comprising:
- providing lignocellulosic biomass at a first pressure greater than atmospheric pressure, comprising:
  - a first solid fraction comprising:
    - cellulose; and
    - lignin; and
  - a first liquid fraction;
- separating said first solid fraction from said first liquid fraction;
- mixing said first solid fraction with water to form a slurry;
- wherein said slurry has a pH of about pH 3.0 to about pH 4.5;
- increasing said pH of said slurry by about 0.5 pH units to about 5.0 pH units to form an adjusted pH slurry;
- optionally, pre-heating said adjusted pH slurry to a temperature less than critical point of water;
- contacting said adjusted pH slurry with a second reaction fluid comprising supercritical or near-supercritical fluid to form a reaction mixture comprising:
  - a second solid fraction comprising:
    - lignin; and
  - a second liquid fraction comprising:
    - a soluble $C_6$ saccharide selected from the group consisting of cello-oligosaccharides, glucose, galactose, mannose, fructose, and mixtures thereof;
    - wherein said supercritical or near-critical fluid comprises water and, optionally, $CO_2$; and
    - wherein said contacting said adjusted pH slurry with a second reaction fluid has a duration greater than about 2 seconds;
- reducing the temperature of said reaction mixture to a temperature below about 280° C.;
- hydrolyzing said second liquid fraction to form $C_6$ saccharides selected from the group consisting of $C_6$ oligosaccharide having lower mer units, glucose, galactose, mannose, fructose, and mixtures thereof; and
- converting by fermentation, catalysis, or a combination thereof said $C_6$ saccharides to a fermentation product, a catalysis product, or a mixture thereof.

Such products include, for example, ethanol and butanol, and mixtures thereof.

In certain embodiments of the method, lignocellulosic biomass is fractionated to remove at least a portion of $C_5$ saccharides by any suitable means, including, but not limited to, hydrothermal treatment (such as hot compressed water, subcritical, near critical, or supercritical water, which may contain other fluids, including alcohol, acid, or base), enzymatic treatment, and the like.

The methods of the invention are preferably run continuously, although they may be run as batch or semi-batch processes.

The methods of the invention may be carried out in any suitable reactor, including, but not limited to, a tubular reactor, a digester (vertical, horizontal, or inclined), or the like.

Suitable digesters include the digester system described in U.S. Pat. No. B-8,057,639, which include a digester and a steam explosion unit, the entire disclosure of which is incorporated by reference.

In certain embodiments, the second supercritical or near-critical fluid is substantially free of $C_1$-$C_5$ alcohols.

In certain embodiments, the step of contacting said adjusted pH slurry with said second reaction fluid is carried out substantially free of catalyst other than carbon dioxide. In certain embodiments, the catalyst is an inorganic acid or an organic acid, or an acid formed in situ. Inorganic acid include, but are not limited to: sulfuric acid, sulfonic acid, phosphoric acid, phosphonic acid, nitric acid, nitrous acid, hydrochloric acid, hydrofluoric acid, hydrobromic acid, hydroiodic acid. Organic acids include, but are not limited to, aliphatic carboxylic acids (such as acetic acid and formic acid), aromatic carboxylic acids (such as benzoic acid and salicylic acid), dicarboxylic acids (such as oxalic acid, phthalic acid, sebacic acid, and adipic acid), aliphatic fatty acids (such as oleic acid, palmitic acid, and stearic acid), aromatic fatty acids (such as phenylstearic acid), and amino acids. In certain embodiments, the acid is preferably sulfuric acid, hydrochloric acid, phosphoric acid, nitric acid, or a combination thereof. Gaseous compounds that form acid in situ include, but are not limited to, $SO_2$, $CO_2$, $NO_2$, HX (where X is Cl, Br, F, or I), or a combination thereof.

In certain embodiments, the step of fractionating comprises contacting said lignocellulosic biomass with a first reaction fluid comprising hot compressed water and, optionally, carbon dioxide; wherein said first reaction fluid further comprises acid, when said lignocellulosic biomass comprises softwood; and wherein said first reaction fluid is at a temperature of at least about 100° C. under a pressure sufficient to maintain said first reaction fluid in liquid form. In certain embodiments, the acid is added as an aqueous acid, is generated by contacting the first reaction fluid with a gaseous compound that forms acid in situ; and/or is generated by contacting the first reaction fluid with a solid acid catalyst. In certain embodiments, the acid is an inorganic acid or an organic acid, or an acid formed in situ. Inorganic acid include, but are not limited to: sulfuric acid, sulfonic acid, phosphoric acid, phosphonic acid, nitric acid, nitrous acid, hydrochloric acid, hydrofluoric acid, hydrobromic acid, hydroiodic acid. Organic acids include, but are not limited to, aliphatic carboxylic acids (such as acetic acid and formic acid), aromatic carboxylic acids (such as benzoic acid and salicylic acid), dicarboxylic acids (such as oxalic acid, phthalic acid, sebacic acid, and adipic acid), aliphatic fatty acids (such as oleic acid, palmitic acid, and stearic acid), aromatic fatty acids (such as phenylstearic acid), and amino acids. In certain embodiments, the acid is preferably sulfuric acid, hydrochloric acid, phosphoric acid, nitric acid, or a combination thereof. Gaseous compounds that form acid in situ include, but are not limited to, $SO_2$, $CO_2$, $NO_2$, HX (where X is Cl, Br, F, or I), or a combination thereof. Suitable solid acids include, but are not limited to, zeolites, anionic exchange resins, and combinations thereof.

In certain embodiments, the step of contacting said adjusted pH slurry with said second reaction fluid has a duration greater than about 2 seconds to about 5 seconds. In other embodiments, the step of contacting said adjusted pH slurry with said second reaction fluid has a duration of about 5 seconds to about 10 seconds.

In certain embodiments, the adjusted pH slurry has a pH of about pH 5.0 to about pH 8.0. In certain preferred embodiments, the adjusted pH slurry has a pH of about pH 5.0 to about pH 6.0.

In certain embodiments, the step of increasing said pH of said slurry comprises adding a base; wherein said base is selected from the group consisting of an organic base, an inorganic base, and combinations thereof. In certain preferred embodiments, the inorganic base is a compound selected from the group consisting of sodium hydroxide, ammonium hydroxide, calcium carbonate, and combinations thereof. In certain particularly preferred embodiments, the inorganic base is sodium hydroxide.

In certain embodiments, the $C_6$ oligosaccharides and monosaccharides may be fermented to ethanol, butanol, and mixtures thereof, using techniques known to those skilled in the art, including, but not limited to, yeast fermentations using *Saccharomyces cerevisiae* and *Clostridium* sp. In certain preferred embodiments, an oligomer fermentor is able to uptake oligomers directly (generally up to a maximum size, for example, of 6 mer units, for *Clostridium thermocellum*).

In certain embodiments, the yield of said $C_6$ monosaccharides is at least 60% of theoretical yield, preferably, at least 65% of theoretical yield.

In certain embodiments, the yield of said glucose is at least 60% of theoretical yield, at least 63% of theoretical yield.

In certain embodiments, the invention is directed to the products produced by the methods of the invention.

In further embodiments, the invention is directed to compositions formed from lignocellulosic biomass, comprising:

$C_6$ saccharides;

less than about 15%, preferably, less than about 10%, by weight, based on the total weight of the composition, of byproducts, wherein said byproducts are selected from the group consisting of glycolaldehyde, glycolic acid, glyceraldehyde, and mixtures thereof; and water;

wherein said $C_6$ saccharides are produced from said lignocellulosic biomass using supercritical or near critical fluids.

In certain embodiments, the $C_6$ saccharide is glucose, galactose, mannose, fructose, or a mixture thereof. In certain preferred embodiments, the $C_6$ saccharide is glucose. The compositions of the invention are particularly useful as starting materials that may be fermented into ethanol, butanol, and other useful materials.

Glycolaldehyde may be easily hydrogenated to mono-ethylene glycol (MEG), using Raney nickel catalyst, for example. In addition, glycolic acid, glycerolaldehyde, lactic acid, and acetic acid are generated, which may be isolated using, for example, liquid-liquid extraction.

The products produced by the methods of the invention may be utilized in a wide variety of applications, where $C_6$ sugars are conventionally utilized, including, but not limited to, the production of various chemicals and fuels using fermentative, enzymatic, catalytic, and non-catalytic (e.g., thermal decomposition) processes. Such processes are useful for preparing feedstocks for the preparation of the following non-exhaustive list:

fuels (such as gasoline, jet fuel, butanol, and the like);

chemicals (such as acetic acid, acetic anhydride, acetone, acrylic acid, adipic acid, benzene, ethanol, ethylene, ethylene glycol, ethylene oxide, methanol, polypropylene, terephthalic acid, toluene, xylene, 1,3-propanediol, 1,4-butanediol, and the like);

pharmaceuticals and foods (such as acetoin, alanine, arabitol, ascorbic acid, aspartic acid, citric acid, coumaric acid, fumaric acid, glycerol, glycine, kojic acid, lactic acid, lysine, malonic acid, proline, propionic acid, serine, sorbitol, succinic acid, threonine, xylitol, sugar acids (glucaric acid, gluconic acid, xylonic acids), and the like);

specialty chemicals (such as acontic acid, glutamic acid, malic acid, oxalic acid, and the like);

textile applications (such as formic acid and the like); and industrial intermediates (acetaldehyde, 3-hydroxypropionic acid, 2,5-furan dicarboxylic acid, furfural, glutaric acid, itaconic acid, levulinic acid, and the like).

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

Cellulose Hydrolysis

Lignocellulosic biomass was processed via a pre-treatment stage wherein hot compressed water was added to a slurry of the lignocellulosic biomass. Operating conditions were defined as:

Pre-Treatment Stage

| | |
|---|---|
| Temperature: | 250° C. |
| Pressure: | 100 bar |
| Residence time: | 1 minute |

The solids from this process were then separated and generally had the compositions as shown in Table 1.

TABLE 1

| Components | Percentage (%) |
|---|---|
| Glucan | 50 ± 5 |
| Xylan | <5 |
| Lignin | 45 ± 5 |
| Ash and others | <5% |

The solids were then mixed with water to form a slurry. This feed generally had a pH of about 4.2. It was then ramped up to a temperature of 250° C. and this temperature was maintained for a small residence time (defined as Pre-heating Stage). Slurry from this stage was then impinged with supercritical water (1:1 weight ratio with respect to the slurry) so that the slurry temperature was immediately raised to reaction temperature. After maintaining this temperature for a certain residence time (defined as Stage 1 of Cellulose Hydrolysis), the feed was quenched with cool water to reduce temperature by about 30° C. before sending it to the heat exchanger (defined as Quench Stage). This is done to retard the reaction. Operating conditions were defined as follows:

Pre-Heating Stage

| | |
|---|---|
| Temperature: | 250° C. |
| Pressure: | 230 bar |
| Ramp up time: | 45 seconds |
| Residence time: | 20 seconds |

Stage 1 of Cellulose Hydrolysis

| | |
|---|---|
| Temperature: | ~377° C. |
| Pressure: | 230 bar |
| Residence time: | 2 seconds |

Quench Stage

| | |
|---|---|
| Temperature: | 340° C. |
| Pressure: | 230 bar |
| Residence time: | none |

It is seen that the residence time of the reaction is extremely small and this makes it very difficult to scale up.

Example 2

Modified Cellulose Hydrolysis

A solid containing 44.5% glucan and 7.3% xylan, was collected from a pretreatment run at 240±10° C. and 1.7±0.5 minutes. Tap water was used to make a 4% slurry and had an initial pH of 4-4.2. For each run, the preheat condition was kept same as 250±5° C. for 20 seconds, the hydrolysis stage was conducted using different temperature and residence time. Slurry pH was increased to different values by adding certain amount of sodium hydroxide (NaOH) solution. After solid/liquor separation, solid and liquor samples were analyzed according to the National Renewable Energy Laboratory (NREL) standard procedures. Table 2 lists the detailed experimental conditions.

TABLE 2

| Sample | pH | Temperature (° C.) | Residence Time (seconds) |
|---|---|---|---|
| 1 | 5 | 320 | 7 |
| 2 | 5 | 335 | 10 |
| 3 | 5 | 350 | 12 |
| 4 | 5 | 365 | 15 |
| 5 | 6 | 320 | 7 |
| 6 | 6 | 335 | 10 |
| 7 | 6 | 350 | 12 |
| 8 | 6 | 365 | 15 |
| 9 | 7 | 320 | 7 |
| 10 | 7 | 335 | 10 |
| 11 | 7 | 350 | 12 |
| 12 | 7 | 365 | 15 |
| 13 | 8 | 320 | 7 |
| 14 | 8 | 335 | 10 |
| 15 | 8 | 350 | 12 |
| 16 | 8 | 365 | 15 |

Figure 2:
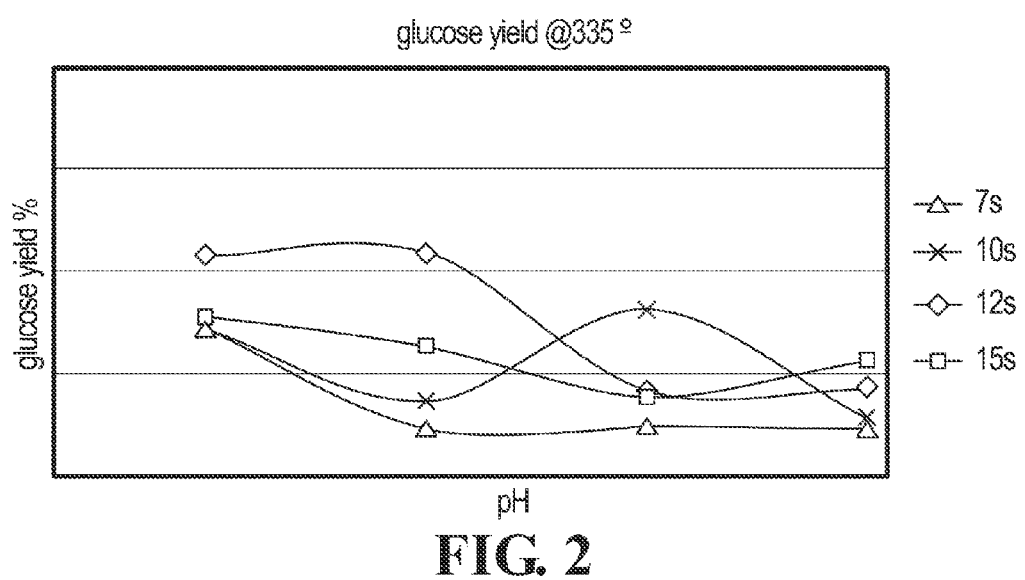
FIG. 2 is a plot of % glucose yield as a function of pH at different residence time of 335° C.
Figure 3:
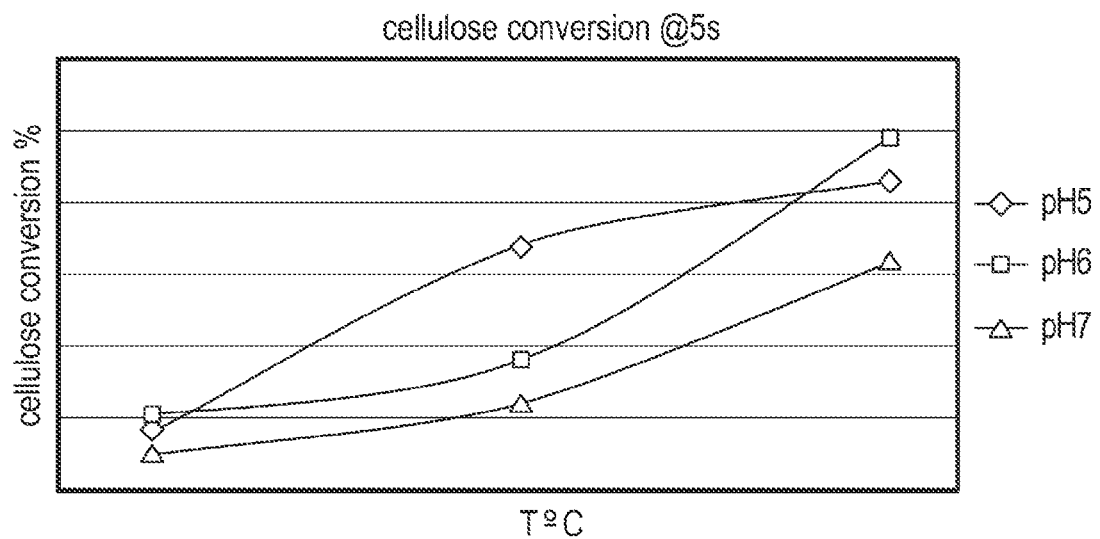
FIG. 3 is a plot of % cellulose conversion as a function of temperature at different pH for a 5 s residence time for one embodiment of the invention.
Figure 4:
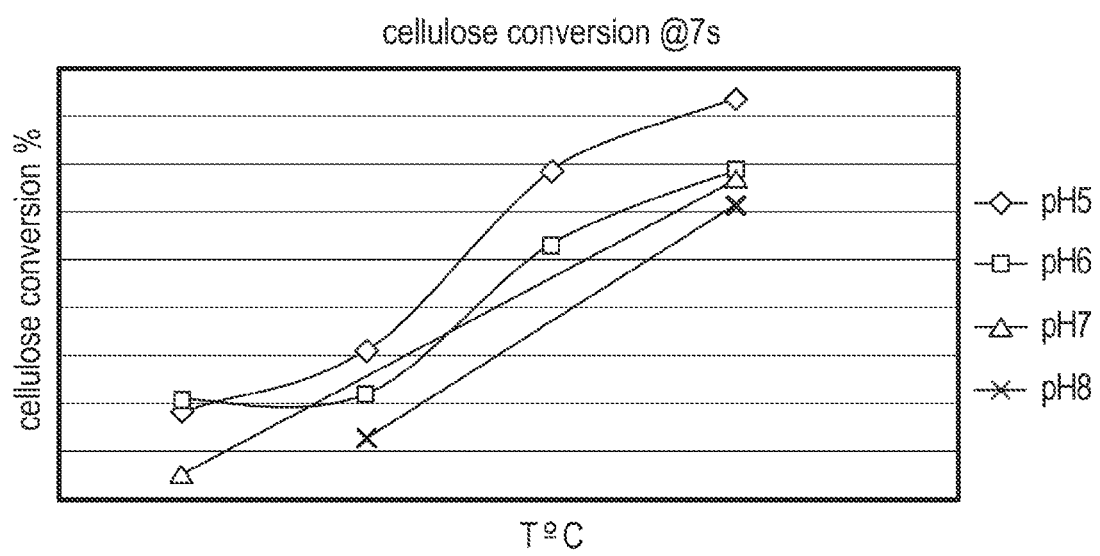
FIG. 4 is a plot of % cellulose conversion as a function of temperature at different pH for a 7 s residence time for one embodiment of the invention.
Figure 5:
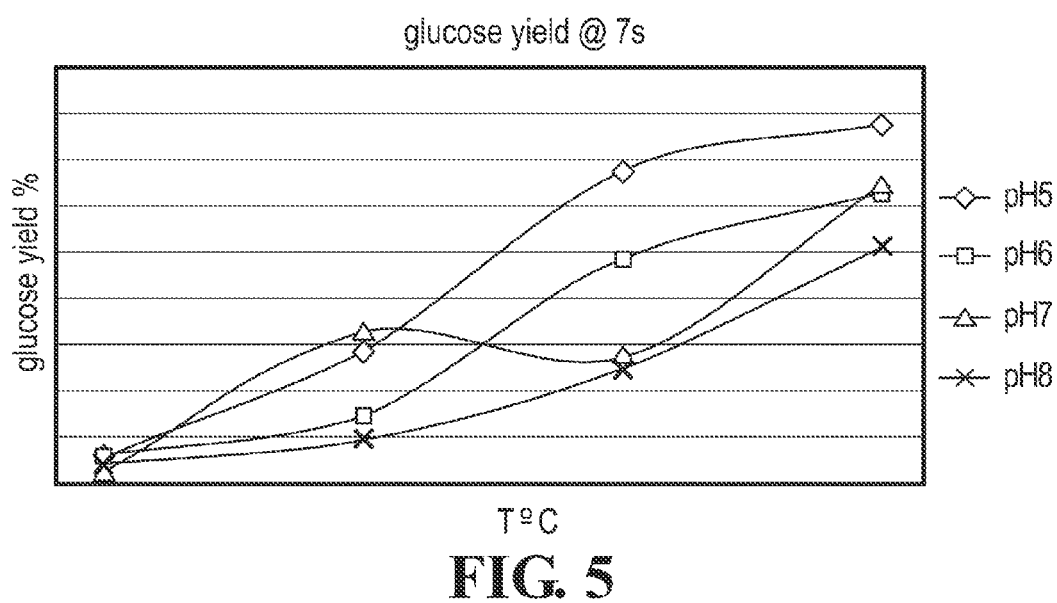
FIG. 5 is a plot of % glucose yield as a function of temperature at different pH for a 7 s residence time for one embodiment of the invention.

Results:

The results are explained as functions of product yields, cellulose conversion at different pH, temperature and residence time as shown in FIG. 1 at a temperature of 335° C. FIG. 2 is a plot of % glucose yield as a function of pH at different residence time of 335° C. FIG. 3 is a plot of % cellulose conversion as a function of temperature at different pH for a 5 s residence time for one embodiment of the invention. FIG. 4 is a plot of % cellulose conversion as a function of temperature at different pH for a 7 s residence time for one embodiment of the invention. FIG. 5 is a plot of % glucose yield as a function of temperature at different pH for a 7 s residence time for one embodiment of the invention.

By increasing pH from 4.2 to about 5-6, the cellulose conversion rate and sugar degradation rates were significantly decreased. For example, the experiments show that at 340° C. at 7-10 s, 20% oligomer yield and >50% glucose still remains in the solid.

Example 3

Effects of Changing Feed Slurry pH on Cellulose Hydrolysis

Feed slurries of the following compositions were tested:
pH of feed slurries: 4.5 (as is), 5.5 and 6.5
Slurry contents: 10-12%
Glucan, %: 52-55%
Xylan, %: ~6%
Lignin, %: ~40%
Experimental Conditions:
Residence time: 0.26 s, 0.4 s, 0.8 s, and 1.1 s
Fixed cellulose hydrolysis temperatures: 375° C.
Results:
The conversion was defined as $$\text{Conversion \%} = 1 - \frac{\text{total water soluble products}}{\text{total incoming glucan}} \times 100\%$$

Figure 6:
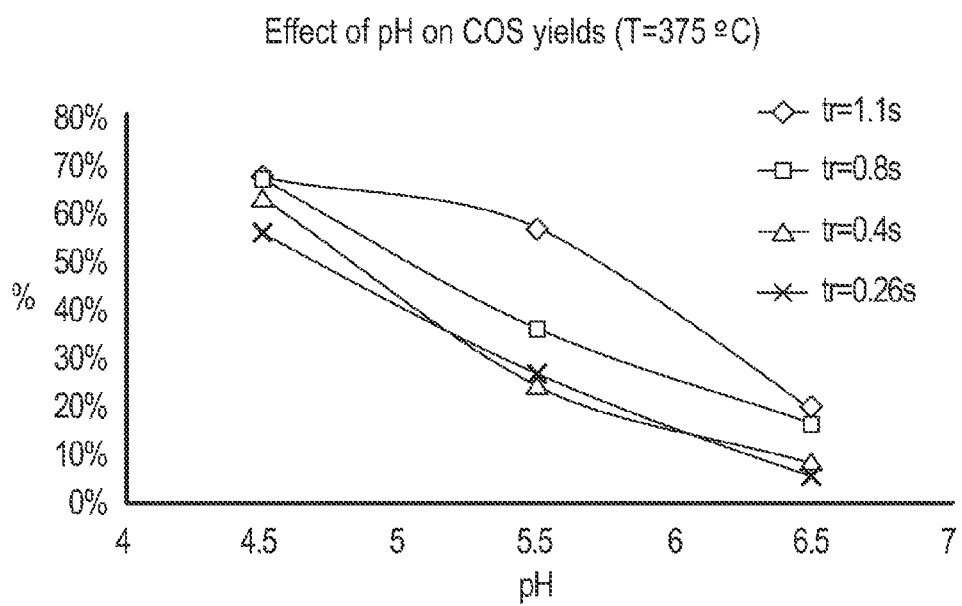
FIG. 6 is a plot of % $C_6$ saccharide yield as a function pH at 375° C. for different residence times for one embodiment of the invention.
Figure 7:
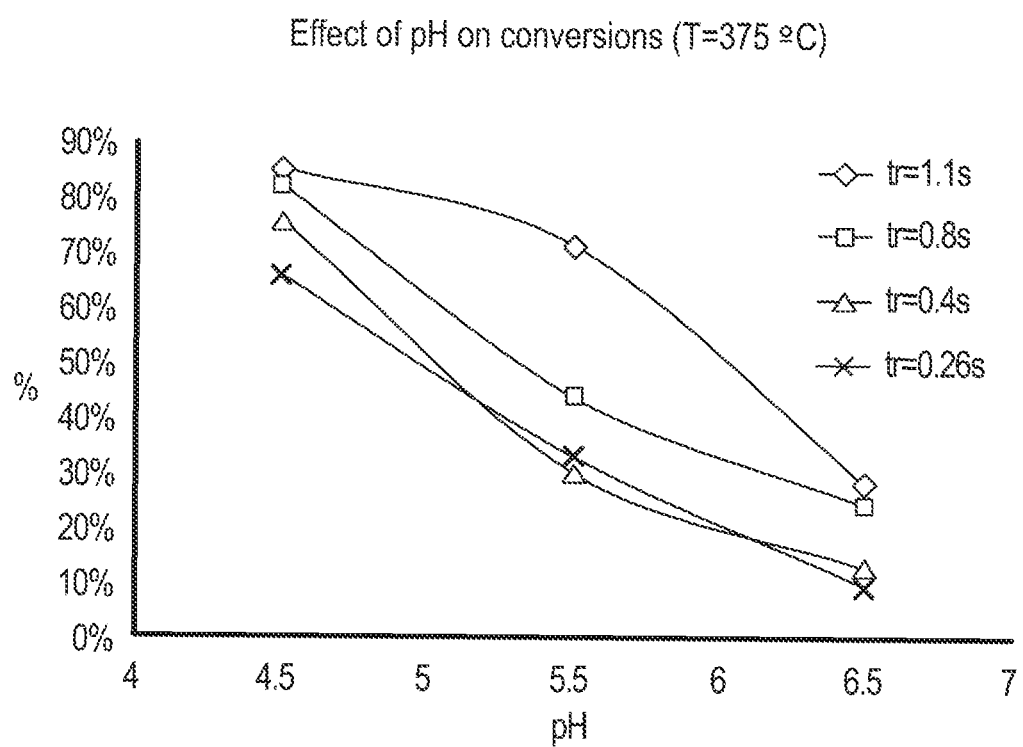
FIG. 7 is a plot of % cellulose conversion as a function of pH at 375° C. for different residence times for one embodiment of the invention.

The results are shown in FIG. 6 and FIG. 7.

Cellulose dissolution/hydrolysis can be catalyzed by acids. Hence reducing the acidity is believed to be able to slow down the reactions. From the above results, for the experiments with increasing pH (decreased acidity):
A. Glucose oligomer yields are decreasing
B. Cellulose conversions (as defined above) are also decreasing and less cellulose were converted to water-soluble products.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method of controlling the rate of cellulose hydrolysis, comprising:
    providing lignocellulosic biomass at a first pressure greater than atmospheric pressure, comprising:
        a first solid fraction comprising:
            cellulose; and
            lignin; and
        a first liquid fraction;
    separating said first solid fraction from said first liquid fraction;
    mixing said first solid fraction with water to form a slurry;
    wherein said slurry has a pH of about pH 3.0 to about pH 4.5;
    increasing said pH of said slurry by about 0.5 pH units to about 5.0 pH units to form an adjusted pH slurry;
    optionally, pre-heating said adjusted pH slurry to a temperature less than the critical point of water;
    contacting said adjusted pH slurry with a second reaction fluid comprising supercritical or near-supercritical fluid to form a reaction mixture comprising:
        a second solid fraction comprising:
            lignin; and
        a second liquid fraction comprising:
            a soluble $C_6$ saccharide selected from the group consisting of cello-oligosaccharides, glucose, galactose, mannose, fructose, and mixtures thereof;
        wherein said supercritical or near-critical fluid comprises water and, optionally, $CO_2$; and
        wherein said contacting said adjusted pH slurry with said second reaction fluid has a duration greater than about 2 seconds;
    optionally, reducing the temperature of said reaction mixture to a temperature below about 280° C.; and
    optionally, hydrolyzing said second liquid fraction to form a $C_6$ saccharide selected from the group consisting of $C_6$ oligosaccharide having lower mer units, glucose, galactose, mannose, fructose, and mixtures thereof.

2. A method of claim 1,
    wherein said method is continuous.

3. A method of claim 1,
    wherein said supercritical or near-critical fluid is substantially free of $C_1$-$C_5$ alcohols.

4. A method of claim 1,
    wherein said step of contacting said adjusted pH slurry with said second reaction fluid is carried out substantially free of catalyst other than carbon dioxide.

5. A method of claim 4,
    wherein said catalyst is an acid.

6. A method of claim 1, further comprising:
    fractionating said lignocellulosic biomass prior to said providing step;
    wherein said step of fractionating comprises contacting said lignocellulosic biomass with a first reaction fluid comprising hot compressed water and, optionally, carbon dioxide;
    wherein said first reaction fluid further comprises acid, when said lignocellulosic biomass comprises softwood; and
    wherein said first reaction fluid is at a temperature of at least about 100° C. under a pressure sufficient to maintain said first reaction fluid in liquid form.

7. A method of claim 1,
wherein said step of contacting said adjusted pH slurry with said second reaction fluid has a duration greater than about 2 seconds to about 5 seconds.

8. A method of claim 1,
wherein said step of contacting said adjusted pH slurry with said second reaction fluid has a duration about 5 seconds to about 10 seconds.

9. A method of claim 1, wherein said adjusted pH slurry has a pH of about pH 5.0 to about pH 8.0.

10. A method of claim 1,
wherein said adjusted pH slurry has a pH of about pH 5.0 to about pH 6.0.

11. A method of claim 1,
wherein said step of increasing said pH of said slurry comprises adding a base;
wherein said base is selected from the group consisting of an organic base, an inorganic base, and combinations thereof.

12. A method of claim 11,
wherein said inorganic base is a compound selected from the group consisting of sodium hydroxide, ammonium hydroxide, calcium carbonate, and combinations thereof.

13. A method of claim 12,
wherein said inorganic base is sodium hydroxide.

14. A method of claim 1,
wherein the yield of said glucose is at least 60% of theoretical yield.

15. A method of reducing the rate of glucose degradation, comprising:
providing lignocellulosic biomass at a first pressure greater than atmospheric pressure, comprising:
a first solid fraction comprising:
cellulose; and
lignin; and
a first liquid fraction;
separating said first solid fraction from said first liquid fraction;
mixing said first solid fraction with water to form a slurry;
wherein said slurry has a pH of about pH 3.0 to about pH 4.5;
increasing said pH of said slurry by about 0.5 pH units to about 5.0 pH units to form an adjusted pH slurry;
optionally, pre-heating said adjusted pH slurry to a temperature less than the critical point of water;
contacting said adjusted pH slurry with a second reaction fluid comprising supercritical or near-supercritical fluid to form a reaction mixture comprising:
a second solid fraction comprising:
lignin; and
a second liquid fraction comprising:
a soluble $C_6$ saccharide selected from the group consisting of cello-oligosaccharides, glucose, galactose, mannose, fructose, and mixtures thereof;
wherein said supercritical or near-critical fluid comprises water and, optionally, $CO_2$; and
wherein said contacting said adjusted pH slurry with a second reaction fluid has a duration greater than about 2 seconds;
optionally, reducing the temperature of said reaction mixture to a temperature below about 280° C.; and
optionally, hydrolyzing said second liquid fraction to form a $C_6$ saccharide selected from the group consisting of $C_6$ oligosaccharide having lower mer units, glucose, galactose, mannose, fructose, and mixtures thereof.

16. A method of claim 15,
wherein said method is continuous.

17. A method of claim 15,
wherein said supercritical or near-critical fluid is substantially free of $C_1$-$C_5$ alcohols.

18. A method of claim 15,
wherein said step of contacting said adjusted pH slurry with said second reaction fluid is carried out substantially free of catalyst other than carbon dioxide.

19. A method of claim 18,
wherein said catalyst is an acid.

20. A method of claim 15, further comprising:
fractionating said lignocellulosic biomass prior to said providing step;
wherein said step of fractionating comprises contacting said lignocellulosic biomass with a first reaction fluid comprising hot compressed water and, optionally, carbon dioxide;
wherein said first reaction fluid further comprises acid, when said lignocellulosic biomass comprises softwood; and
wherein said first reaction fluid is at a temperature of at least about 100° C. under a pressure sufficient to maintain said first reaction fluid in liquid form.

21. A method of claim 15,
wherein said step of contacting said adjusted pH slurry with said second reaction fluid has a duration greater than about 2 seconds to about 5 seconds.

22. A method of claim 15,
wherein said step of contacting said adjusted pH slurry with said second reaction fluid has a duration about 5 seconds to about 10 seconds.

23. A method of claim 15,
wherein said adjusted pH slurry has a pH of about pH 5.0 to about pH 8.0.

24. A method of claim 15,
wherein said adjusted pH slurry has a pH of about pH 5.0 to about pH 6.0.

25. A method of claim 15,
wherein said step of increasing said pH of said slurry comprises adding a base;
wherein said base is selected from the group consisting of an organic base, an inorganic base, and combinations thereof.

26. A method of claim 25,
wherein said inorganic base is a compound selected from the group consisting of sodium hydroxide, ammonium hydroxide, calcium carbonate, and combinations thereof.

27. A method of claim 26,
wherein said inorganic base is sodium hydroxide.

28. A method of claim 15,
wherein the yield of said glucose is at least 60% of theoretical yield.

29. A method, comprising:
providing lignocellulosic biomass at a first pressure greater than atmospheric pressure, comprising:
a first solid fraction comprising:
cellulose; and
lignin; and
a first liquid fraction;
separating said first solid fraction from said first liquid fraction;
mixing said first solid fraction with water to form a slurry;
wherein said slurry has a pH of about pH 3.0 to about pH 4.5;

increasing said pH of said slurry by about 0.5 pH units to about 5.0 pH units to form an adjusted pH slurry;

optionally, pre-heating said adjusted pH slurry to a temperature less than the critical point of water;

contacting said adjusted pH slurry with a second reaction fluid comprising supercritical or near-supercritical fluid to form a reaction mixture comprising:
- a second solid fraction comprising:
  - lignin; and
- a second liquid fraction comprising:
  - a soluble $C_6$ saccharide selected from the group consisting of cello-oligosaccharides, glucose, galactose, mannose, fructose, and mixtures thereof;
  - wherein said supercritical or near-critical fluid comprises water and, optionally, $CO_2$; and
  - wherein said contacting said adjusted pH slurry with a second reaction fluid has a duration greater than about 2 seconds;

reducing the temperature of said reaction mixture to a temperature below about 280° C.;

hydrolyzing said second liquid fraction to form $C_6$ saccharides selected from the group consisting of $C_6$ oligosaccharide having lower mer units, glucose, galactose, mannose, fructose, and mixtures thereof; and converting by fermentation, catalysis, or a combination thereof said $C_6$ saccharides to a fermentation product, a catalysis product, or a mixture thereof.

* * * * *